Patented May 30, 1950

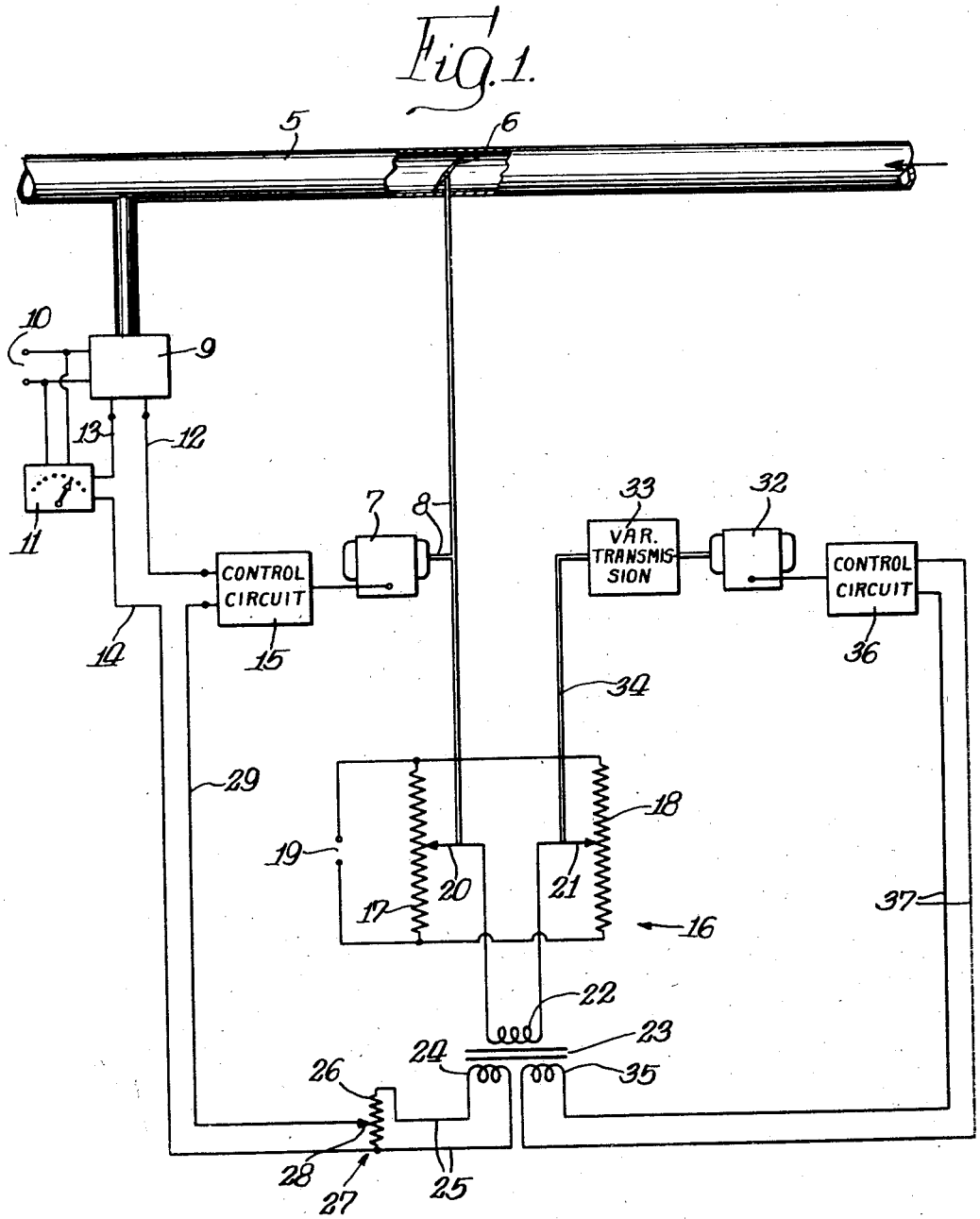

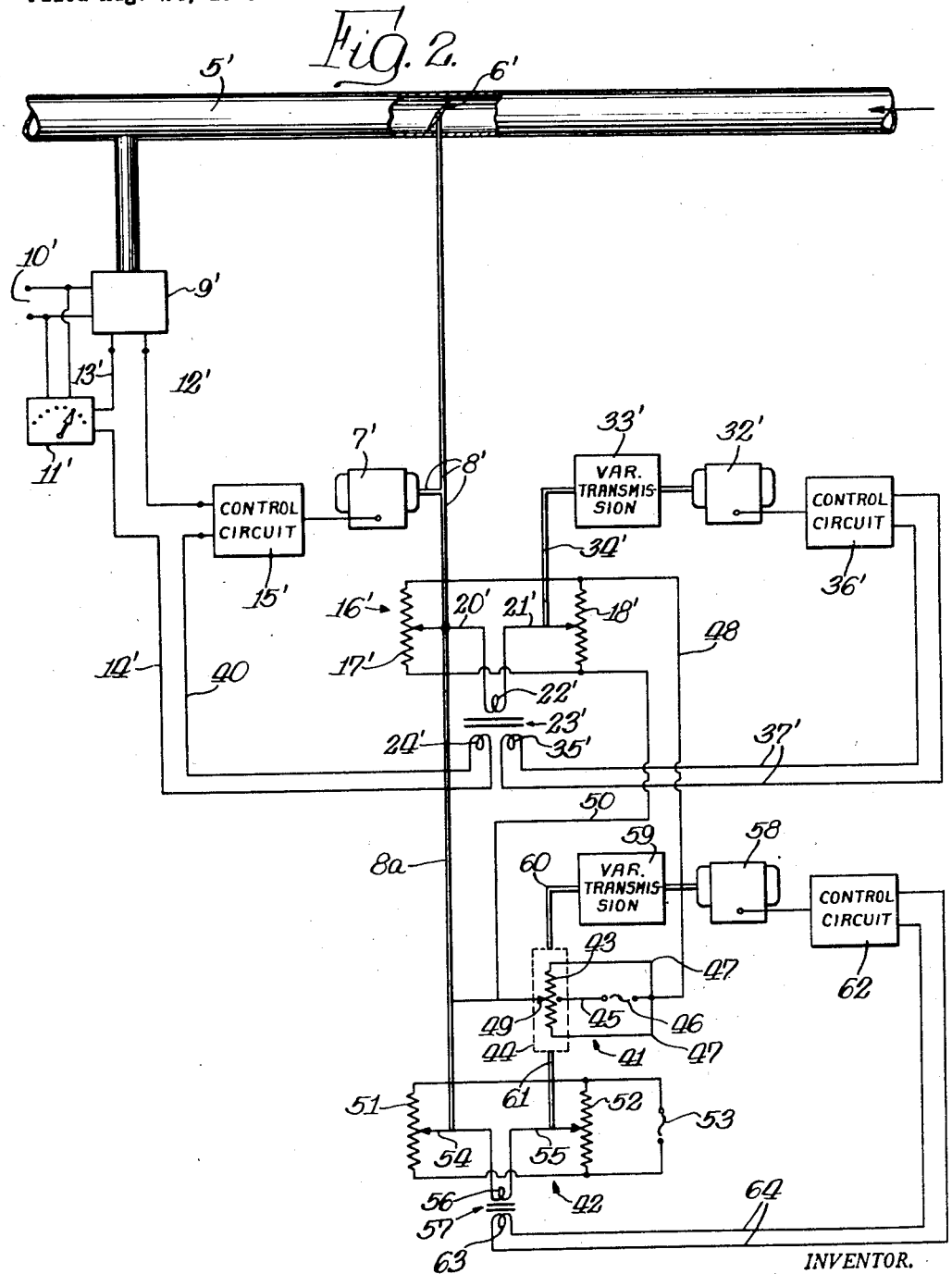

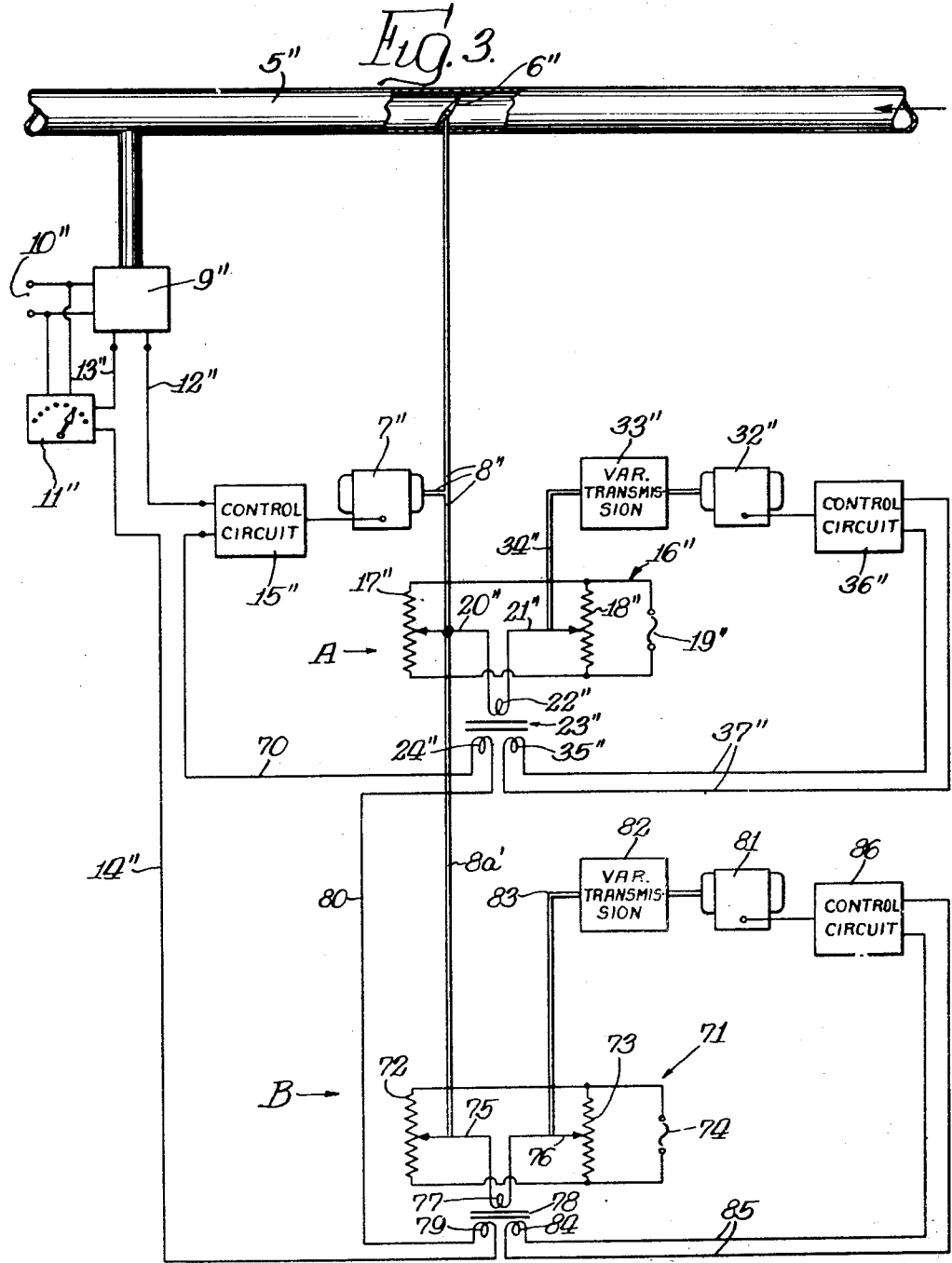

2,509,295

UNITED STATES PATENT OFFICE 2,509,295

STABILIZED SYSTEM FOR CONTROLLING A CONDITION

Paul Glass, Chicago, Ill., assignor to Askania Regulator Company, Chicago, Ill., a corporation of Illinois Application August 24, 1946, Serial No. 692,939

10 Claims. (Cl. 318—29)

1

The invention relates to systems for the control of a condition such as flow, pressure, temperature and the like, and has as a general object to perfect new and improved and, particularly, stabilized systems of that character.

Another object is to provide a system for the control of a condition having a main portion including means operable upon adjustment of a condition influencing means to generate a signal opposed to the signal calling for adjustment and proportional to the adjustment, and an auxiliary portion operable under the influence of the opposing signal gradually to remove the opposing signal.

Another object is to provide a system for the control of a condition having an adjustable condition influencing means, means responsive to the condition, and means adjustable to predetermine the value of the condition to be maintained, the latter two means being jointly operable to generate a main control signal upon departure of the condition from the predetermined value and signal generating means independent of the means generating the main control signal but connected in circuit therewith including means for generating a signal proportional to the adjustment of the condition influencing means and opposed to the main signal, and means governed by the last named signal to effect complete removal of that signal.

A further object is to provide a system for the control of a condition having adjustable means for influencing the condition and means operable to generate a main control signal upon departure of the condition from a predetermined value, and means coming into play as an incident to adjustment of the condition influencing means and tending to counteract the main control signal including signal generating means adjusted proportionally to the adjustment of the condition influencing means, auxiliary means responsive to the signal of the last named signal generating means operable to eliminate that signal, and means also brought into operation as an incident to adjustment of the condition influencing means functioning to determine the effectiveness of the counteracting signal generating means.

A further object is to provide a system for the control of a condition having adjustable means for influencing the condition, means operable to generate a main control signal upon departure of the condition from a predetermined value, and a pair of independently operating but jointly acting means brought into operation as an incident to adjustment of the condition influencing means

2 and serving to modify the main control signal, each of the last named means having means responsive to the signal generated by each such last named means functioning to eliminate the signal generated by the last named signal means.

Other objects and advantages will become apparent from the following detailed description taken in connection with the accompanying drawings, in which:

Fig. 1 is a diagrammatic illustration of a control system embodying the features of my invention.

Fig. 2 is a diagrammatic illustration of a modified form of the invention shown in Fig. 1.

Fig. 3 is a diagrammatic illustration of a still further modified form of the system disclosed in Fig. 1.

While the invention is susceptible of various modifications and alternative constructions, it is herein shown and will hereinafter be described in a basic embodiment and two modifications. It is not intended however that the invention is to be limited thereby to the specific disclosures made. On the contrary, it is intended to cover all modifications and alternative constructions falling within the spirit and scope of the invention as defined in the appended claims.

Speaking generally, the system disclosed herein in the several embodiments is devised to control a condition, more particularly, to maintain a condition at some predetermined state or value. By the term condition is here meant any physical or chemical property, characteristic, or state capable of measurement and control, for example, pressure, temperature, flow, rate of combustion, rate of chemical action, or the like. A system of this character comprises broadly a condition influencing means adjustable by some controlled power means so as to influence in opposite directions the condition being controlled. The power means must of necessity be in part controlled by the condition and to that end the system includes means resposive to the condition which indicates the state of the condition and, moreover, does so in terms or in a factor which can be utilized for control of the power means. To predetermine the value or state of the condition to be maintained, manually adjustable means is provided, the manual means and the means responsive to the condition being through suitable coupling or integrating means rendered operative to generate a signal capable of controlling the power means. Inasmuch as there is still some time lag between the call for adjustment of the condition and actual adjustment thereof in accordance with the call, despite the high sensitivity and high speed of operation of present day devices, and, because the condition itself may be slow to respond or inherently possesses other characteristics that must be taken into account, means is provided herein to compensate for such time lag or such characteristics by anticipating the ultimate change that will be effected in the condition by an adjustment of the condition influencing means. Such anticipation is herein effected through modification of the signal calling for adjustment of the condition influencing means with the modification that is or can be effected varying with the different embodiments of the invention. Common to all of the embodiments, however, is the fact that operation of the means effecting the modification of the control signal is initiated as an incident to adjustment of the condition influencing means and that in part the modifying means is adjusted in proportion to the extent of adjustment of the condition influencing means. Also common is the fact that the modifying means includes auxiliary apparatus responsive to the signal generated by the modifying means and operating to remove the modifying action. The removal of the modifying action is preferably so timed as to be completely terminated simultaneously with the return of the condition to its predetermined value or state.

Turning now to the basic though exemplary embodiment of the invention shown in Fig. 1, the condition to be controlled is the pressure of a fluid flowing in a conduit 5, the flow of fluid through the conduit being in the direction of the arrow and the conduit being connected at the right to some suitable source not here shown. Influencing the pressure in the conduit 5 is a valve 6 adjustable to various positions by a reversible, variable speed, electric motor 7 operating through suitable linkage or gearing, herein very diagrammatically shown at 8. The conduit 5, of course, leads to some device (not here shown) which utilizes the fluid supplied thereto and whose demand varies and thus produces fluctuations in the pressure of the fluid in the conduit 5 which are to be met and overcome by adjustment of the valve means 6. Responsive to the pressure in the conduit 5 is a means 9 which serves to translate or convert pressure values into some other factor capable of being utilized in the control of the valve means 6. Herein the means 9 converts pressure values into electrical signals varying in some respect, for example, voltage, with variation in the pressure of the fluid in the conduit 5. Though any one of several well known means of this character may be employed (see Fig. 2 of Ryder Patent No. 2,015,967; Fig. 1 of Schmitt Patent No. 2,255,601; element C of Fig. 2 of Glass Patent No. 2,410,651; or element 17 of Fig. 1 of Glass Patent No. 2,417,868), the means 9 is shown as energized from an alternating current source 10 and thus produces an alternating current signal.

Also energized from the same alternating current source 10 is a second signal generating means 11 operable to generate a signal of the same type as that generated by the means 9 but of opposed character. The means 11 is manually adjustable and functions as a condition-value-predetermining means, herein the pressure at which the fluid in the conduit 5 is to be maintained. As in the case of means 9, any one of several well known means may be employed and specifically might take the form of element C of my Patent No. 2,410,651. The pressure actuated means 9 and the manual means 11 are electrically connected in series as by leads 12, 13, and 14 and thus produce what will hereinafter be termed the main signal. The means 9 and 11 are, of course, so adjusted that the signals produced thereby will be of equal value and thus cancel out and produce a resultant main signal of zero magnitude when the pressure in the conduit 5 is at the value predetermined by adjustment of the means 11. Any departure of the pressure from this predetermined value will, of course, result in the generation of a signal by the means 9 which is either greater or smaller than the signal generated by the means 11 and thus will produce a main signal varying in magnitude with the extent of departure of the pressure from the predetermined value and varying in character with the direction of departure so as to indicate both the extent and the direction in which correction should be made. While it is conceivable that the main signal thus produced jointly by the means 9 and 11 might be employed directly to control the motor 7, a motor control circuit 15 is herein provided. This control circuit can be any one of a plurality of such control circuits capable of receiving the signal and in response to that signal causing the motor to rotate in one direction or the other at a speed varying with the magnitude of the signal or to remain idle as the signal may dictate. One such control circuit is illustrated in my Patent No. 2,417,868.

As above mentioned, means is provided which anticipates the ultimate but delayed effect which adjustment of the valve means 6 will have on the pressure in the conduit 5 and functions to avoid overadjustment herein by offsetting the main signal and thus arresting adjustment of the valve means 6 at an earlier time. This main signal modifying means herein produces an offsetting signal which is a function of the extent of adjustment of the valve means 6, and, by way of example, takes the form of a bridge network, generally designated 16. A resistance bridge is here shown and comprises resistors 17 and 18, a source of alternating current potential 19 connected in conventional manner to the resistors and a pair of movable contacts 20 and 21. Connected between the contacts 20 and 21 is a coil 22 forming the primary winding of a transformer 23. The movable contact 20 is adjusted in a direction and proportionally in extent to the direction and extent of adjustment of the valve means 6, and to that end is here diagrammatically shown as operatively associated with the linkage 8.

Forming part of the secondary winding of the transformer 23 is a coil 24 connected by leads 25 to the ends of a resistor 26 forming part of a potentiometer 27. Completing the potentiometer is an adjustable contact 28 connected by a lead 29 to the motor control circuit 15, one end of the resistor 26 being connected to the lead 14 to complete the connection of the potentiometer in series with the signal means 9 and 11. When the bridge 16 is in balance, there is no potential across the primary winding 22 and thus, of course, no signal is added to that produced by the means 9 and 11. With adjustment of the valve means 6, however, the bridge is unbalanced to an extent and in a direction depending upon the extent and direction of adjustment of the valve means 6 and thus there is produced a signal which is proportional to the extent of adjustment of the valve means 6 and which is of one character, herein phase, when the valve is adjusted in one direction, and of an opposed character or phase when the valve means is adjusted in the opposite direction. This signal, moreover, is, of course, arranged to oppose or be of the opposite character from the main signal so as to serve to tend to offset the main signal. The extent to which the offsetting signal does offset the main signal is, of course, variable through adjustment of the potentiometer 27. Hence, depending upon the adjustment of the potentiometer 27, adjustment of the valve means 6 simultaneously creates an offsetting signal increasing as the extent of adjustment of the valve means 6 increases and thus tending to arrest adjustment of the valve means 6 at a time in advance of the time when it would normally be arrested were the control of the motor 7 dependent entirely upon the pressure of the fluid in the conduit 5. Thus by the provision of the means for producing this offsetting signal, the time lag and its effect can be compensated for and overadjustment of the valve means 6 avoided.

Means is provided, being the auxiliary portion of the system above referred to, for removing the offsetting signal produced by unbalancing of the bridge 16 as an incident to adjustment of the valve means 6. This is here accomplished by restoring the balance of the bridge 16 and, more particularly, by adjustment of the contact 21. To that end, there is provided a reversible, variable speed, electric motor 32 which acts through a variable speed transmission 33 and suitable linkage diagrammatically represented at 34 to move the contact 21 in opposite directions. The motor 32 is governed by the offsetting signal and to that end there is provided in the secondary of the transformer 23 a coil 35 for picking up the offsetting signal and utilizing the same to govern the motor 32. While this signal might be employed directly to govern the motor, preferably a motor control circuit 36 is utilized. This motor control circuit can be the same as motor control circuit 15 or it may take any other form capable of responding to the signal produced by the bridge 16 and utilizing that signal to govern the direction and speed of rotation of the motor 32. The coil 35 is by a pair of leads 37 connected to the motor control circuit 36 which in turn is electrically connected with the motor 32. It is believed readily apparent from the foregoing that the motor 32 will operate whenever and so long as there is any unbalance of the bridge 16, and that, therefore, this auxiliary portion of the system will always operate to restore the bridge to balanced condition. The variable speed transmission 33 is provided in order that the rate of restoration of balance may be controlled for that rate may want to be varied depending upon the condition which is being maintained.

While the operation of the system should be readily understandable from the foregoing, a brief recitation of the operation may be helpful in the full understanding of the invention. Let it be assumed, therefore, that the manual means 11 has been adjusted to determine the value of the condition to be maintained and that momentarily the pressure in the conduit 5 is at the value desired, and that both the motor 7 and the motor 32 are at rest, that is, that the system is in a state of equilibrium with the various signals going to make up the main control signal balancing out and the bridge 16 also balanced. If now it be assumed that the load or demand is increased, there will, of course, result a drop in pressure in the conduit 5. As a result, the means 9 responsive to the pressure will generate a signal of smaller magnitude, specifically, of a magnitude smaller than that generated by the means 11. There is now a signal determined by the extent of difference in magnitude of the signal generated by the means 9 and 11 and of a character determined by the fact that the signal of the means 9 is smaller than that of the means 11 which calls for adjustment of the valve means 6 in a direction to raise the pressure in the conduit 5, that is, an opening movement of the valve means 6. As arranged, the motor control circuit 15 responds to this signal, usually amplifies the same, and then uses the signal to cause the motor 7 to rotate in such direction that the valve means 6 will be moved further toward open position.

Movement of the valve means 6 toward open position, of course, gradually increases the pressure in the conduit 5 and such increase in pressure acting through the means 9 would eventually and upon a sufficient building up of the pressure produce a signal equal to that produced by the manual means 11 and thus arrest the motor 7 and opening movement of the valve means 6. By that time, however, the valve means 6 would have been overadjusted and the pressure would then rise above the desired value and the system would immediately have to start closing the valve means. To avoid this, the bridge network 16 is provided. Simultaneously with the first adjustment of the valve means 6, the contact 20 is also moved and, moreover, is moved proportionally to the extent of adjustment of the valve means 6. There is thus set up a signal opposed to the main control signal. Under the assumption here made, this signal would be additive to the signal produced by the means 9 so as to tend to have the combined signals offset the signal of the adjustable means 11. It will be appreciated, of course, that the proportion of the signal generated by the bridge 16 which is added to the signal of means 9 varies with adjustment of the potentiometer 27, and that, as the value of the added signal is made larger for a given adjustment of the valve means 6, the main control signal will be the more rapidly offset and thus the extent of adjustment of the valve means 6 reduced.

The offsetting signal producing means thus serves as a means of anticipating the pressure that will eventually be arrived at for a given adjustment of the valve means 6 after the time delay in the system is overcome and thus avoids overadjustment of the valve means 6. If the offsetting signal remained present indefinitely, which would be the case unless the valve means 6 were moved back to the position which it had at the beginning of the assumed change in condition, the offsetting signal in and of itself would call for adjustment of the valve means in a direction opposite to that in which the valve had just been moved as soon as the condition started back toward the value determined by adjustment of the manual means 11. In other words, if the offsetting signal is not removed, a "droop" or "offset" would be introduced and the condition would not return to the desired value as determined by the means 11. Hence the auxiliary portion of the system is, simultaneously with adjustment of the valve means 6, brought into operation to remove the offsetting signal. As above described, the auxiliary portion of the system is responsive to the presence of any offsetting signal, that is, unbalance of the bridge 16, and is arranged to tend to restore the balance, that is, remove the offsetting signal. Thus at some time after or just as the valve means 6 is arrested, the bridge network 16 will again be balanced and the entire offsetting signal removed. It will be appreciated that the variable transmission 33 may be adjusted so as to cause the bridge 16 to be balanced at a relatively slow rate or to have this occur so rapidly that the contact 21 moves almost simultaneously with the contact 20, so that at no time is there any substantial offsetting signal and such little offsetting signal as there was is wiped out almost simultaneously with arrest of adjustment of the valve means 6. Any intermediate adjustment in between the two extreme cases mentioned may be selected.

Inasmuch as the deficiency in supply of fluid to the conduit 5 had to be made up before the pressure in the conduit could return to the desired value, the valve means 6 had to be opened wider than its final position to permit that make-up in the deficiency of the supply. As a consequence, once that deficiency has been made up and the pressure brought back to the desired value, it is necessary to close the valve means somewhat so as to stabilize the pressure at the desired value. Hence there will be a call for slight adjustment of the valve means 6 in a closing direction with the system now operating in the same manner but in the opposite direction from that above described, and presently the valve means 6 will have taken a position where the supply of fluid is such that the demand is met with the pressure in the conduit 5 back at the desired value as predetermined by adjustment of the means 11.

Turning now to the form of the invention shown in Fig. 2, it will be seen that the system disclosed therein embodies a large portion of the basic system disclosed in Fig. 1. In addition, there is disclosed in Fig. 2 an improved and refined main signal modifying means in order that enhanced control by the system may be obtained and in order that conditions or characteristics other than a mere time lag may be compensated for.

The system is still adapted to control, more particularly to maintain constant, a condition such as the pressure of a fluid flowing in a conduit 5', the flow again being in the direction of the arrow with the conduit 5' connected at the right to some suitable source (not here shown). Influencing the pressure in the conduit 5' is a valve 6' adjusted to various positions by a reversible, variable speed, electric motor 7' operating through suitable linkage or gearing, herein very diagrammatically shown at 8'. Responsive to the pressure in the conduit 5' is a means 9' which converts pressure in the conduit 5' into electrical signals varying in magnitude with variation in the pressure of the fluid in the conduit 5'. The means 9' is shown as energized from an alternating current source 10' and thus produces an alternating current signal.

Also energized from the same alternating current source 10' is a second signal generating means 11' operable to generate a signal of the same type as that generated by the means 9' but of opposed character. The means 11' is manually adjustable and functions as a condition-value-predetermining means, herein, of course, the pressure in the conduit 5'. The pressure actuated means 9' and the manual means 11' are electrically connected in series by leads 12', 13' and 14' and produce what will hereinafter be termed the main signal. The means 9' and 11' are adjusted and function as pointed out for the means 9 and 11 of Fig. 1. Suffice it to say, therefore, that with a change in pressure in the conduit 5' there will result a main signal which is proportional in magnitude with the extent of departure of the pressure from a predetermined value and which varies in character with the direction of departure so as to indicate both the extent and the direction in which correction should be made. A motor control circuit 15 is preferably utilized to receive the main signal and to convert or amplify or both for control of the motor 7'.

As in the embodiment shown in Fig. 1, means is provided for modifying the main signal in order that various factors or characteristics may be recognized and compensated for and thus produce an improved system free of hunting even though unusual factors may be present. This modifying means still takes the form of a bridge network, generally designated 16', and constituting a third signal generating means. A resistance bridge is here shown and comprises resistors 17' and 18' and a pair of movable contacts 20' and 21'. Connected between the contacts 20' and 21' is a coil 22' forming the primary winding of a transformer 23'. The movable contact 20' is adjusted in a direction and proportionally in extent to the direction and extent of adjustment of the valve means 6' and, to that end, is here diagrammatically shown as operatively associated with the linkage 8'.

Forming part of the secondary winding of the transformer 23' is a coil 24' one end or terminal of which is connected to the lead 14' and the other end or terminal of which is by a lead 40 connected to the motor control circuit 15'. The coil 24' is, as readily seen and understood, thus connected in series with the signal generating means 9' and 11'. It is, moreover, so connected as to oppose the main signal generated by the combined effect of the means 9' and 11'. Thus, depending upon the direction of adjustment of the valve 6', the signal generated by the means 16' will aid or will oppose the signal generated by the means 9'.

Means is provided for removing the signal produced by unbalancing of the bridge 16' as an incident to adjustment of the valve means 6'. This is accomplished by restoring the balance of the bridge 16' and, more particularly, by adjustment of the contact 21'. To that end, there is provided a reversible variable speed electric motor 32' which acts through a variable speed transmission 33' and suitable linkage or gearing, diagrammatically represented at 34', to move the contact 21' in opposite directions. The motor 32' is governed by the signal generated by the network 16' and, to that end there is provided in the secondary of the transformer 23' a coil 35' for picking up that signal. Preferably a motor control circuit 36' is utilized to govern the motor 32' in accordance with the signal. This motor control circuit can be the same as control circuit 15' or it may take any other form capable of responding to the signal produced by the bridge 16' including a circuit that is adjustable so as to result in different speeds of operation of the motor 32' for any given signal. When a control circuit of the latter type is employed, it replaces and obviates the necessity of the variable transmission 33'. The coil 35' and the control circuit 36' are connected by a pair of leads 37'.

The potential for the bridge 16' is not a constant source but herein is itself variable to provide increased flexibility of the main signal modifying means. This potential source is composed of two networks, generally designated 41 and 42, respectively. Of these two, network 41 constitutes the direct potential source for the bridge network 16', while network 42 constitutes means for generating a signal governing means serving to effect adjustments of the network 41.

More specifically, the network 41 comprises a resistor 43 mounted for bodily movement longitudinally on a frame or support 44. The midpoint of the resistor 43 is by a lead 45 connected to one terminal of a potential source, herein an alternating current potential represented at 46. The ends of the resistor 43 are by leads 47 connected to the other terminal of the potential source 46 and by a lead 48 connected to a common end of each the resistors 17' and 18' of the bridge 16'. Completing the network 41 is a contact 49 which is movable relative to the resistor 43 and which is by a lead 50 connected to the remaining ends of the resistors 17' and 18'.

The network 42 is a resistance bridge network having a pair of resistors 51 and 52 connected in well known manner to an alternating current source, here represented at 53. Completing the network are a pair of movable contacts 54 and 55 having connected therebetween the primary coil 56 of a transformer, generally designated 57.

Herein both the network 41 and the network 42 are caused to be unbalanced and thus come into operation as an incident to adjustment of the valve means 6'. Moreover, both networks are given an adjustment which is proportional in amount to the extent of adjustment of the valve means 6' and in a direction corresponding to the direction of adjustment of the valve means 6'. To that end, both the movable contact 49 and the movable contact 54 are actuated by an extension 8a of the linkage 8'. The network 41 is restored to normal position and the network 42 is restored to balanced condition by means responsive to and under the control of the signal generated by the network 42. This means may be and herein is the same as that which restores the bridge network 16' and thus comprises a variable speed, reversible electric motor 58 operating through a variable transmission 59 and suitable linkage 60 and 61 which is connected to the frame or support 44 and the movable contact 55 to adjust the same simultaneously. The motor 58 is governed by the signal generated by the network 42 through the medium of a control circuit 62 electrically connected with the motor 58 and picking up the signal generated by the network 42 through a coil 63 forming the secondary of the transformer 57 and connected by a lead 64 to the control circuit 62.

It will be noted, because of the arrangement of the network 41, the full voltage of the source 46 is applied to the bridge 16' only so long as the movable contact 49 is in its normal position. With any adjustment of the contact 49 which occurs, of course, with any adjustment of the valve 6', the voltage applied to the network 16' is reduced. It is conceivable, therefore, that upon adjustment of the valve means 6' the movable contact 20' of the bridge 16' might be adjusted to produce maximum unbalance of that bridge, while at the same time the movable contact 49 of the network 41 would be adjusted so that little, if any, potential would be applied to the bridge 16' and thus this maximum unbalance would still produce no greater modifying effect on the main signal than if the bridge 16' were but slightly unbalanced. With the contacts 20', 49 and 54 of the various networks connected to be adjusted simultaneously and in accordance with adjustment of the valve means 6', it will readily be apparent that the relative unbalance of the various networks will be dependent upon the speed at which balance is restored by the auxiliary means. If the means actuating contact 21' is adjusted to adjust the contact 21' quickly with even the slightest unbalance of the bridge 16', whereas the means actuating the frame 44 and the contact 55 is adjusted to operate very slowly, then, of course, one character of the modifying effect on the main signal is had, whereas if the contrary is true, then a modifying effect of opposed character will be had. It will be apparent that in between the two extremes there are a great number of variations that can be effected so as to produce a great number of different effects on the control signal. By way of example, the various bridge-balance-restoring means might be so adjusted that the signal generated by the means 9' and 11' might for a certain initial period of time be given full control in order that the full signal might be employed to effect a rapid adjustment of the valve means 6'. Thereafter, the main signal might be completely offset to arrest further adjustment of the valve means 6' and the modifying or offsetting signal reduced at such rate as to coincide more or less exactly with the change in pressure which is occurring as an incident to adjustment of the valve means 6'. Other variations will, it is believed, readily occur to those skilled in the art, and the importance of this contribution will thus be appreciated.

Turning now to the form of the invention shown in Fig. 3, it will be seen that the system disclosed therein embodies a large portion of the basic system disclosed in Fig. 1. In addition, there is disclosed in Fig. 3 main signal modifying means improved and refined over both Figs. 1 and 2, in order that enhanced control by the system may be obtained including a mode of operation in which the main signal and the modifying signal are actually additive. As a result it is possible to obtain an initial adjustment of the condition controlling means greater than that called for by the main signal, thus effecting a more rapid restoration of the condition.

The system is still adapted to control, more particularly to maintain constant, a condition such as the pressure of a fluid flowing in a conduit 5'', the flow again being in the direction of the arrow with the conduit 5'' connected at the right to some suitable source (not here shown). Influencing the pressure in the conduit 5'' is a valve 6'' adjusted to various positions by a reversible, variable speed, electric motor 7'' operating through suitable linkage or gearing, herein very diagrammatically shown at 8''. Responsive to the pressure in the conduit 5'' is a means 9'' which converts pressure in the conduit 5'' into electrical signals varying in magnitude with variation in the pressure of the fluid in the conduit 5''. The means 9'' is shown as energized from an alternating current source 10'' and thus produces an alternating current signal.

Also energized from the same alternating current source 10'' is a second signal generating means 11'' operable to generate a signal of the same type as that generated by the means 9'' but of opposed character. The means 11'' is manually adjustable and functions as a condition-value-predetermining means, herein, of course, the pressure in the conduit 5". The pressure actuated means 9" and the manual means 11" are electrically connected in series by leads 12", 13" and 14" and produce what will hereinafter be termed the main signal. The means 9" and 11" are adjusted and function as pointed out for the means 9 and 11 of Fig. 1. Suffice it to say, therefore, that with a change in pressure in the conduit 5" there will result a main signal which is proportional in magnitude with the extent of departure of the pressure from a predetermined value and which varies in character with the direction of departure so as to indicate both the extent and the direction in which correction should be made. A motor control circuit 15" is preferably utilized to receive the main signal and to convert or amplify the same, or both, for control of the motor 7".

As in the embodiment shown in Fig. 1, means is provided for modifying the main signal in order that various factors or characteristics may be recognized and compensated for and thus produce an improved system free of hunting even though unusual factors may be present. The modifying means herein takes the form of a pair of signal generating means independently operable and connected in opposing relation in series with one another and in series with the signal generating means 10" and 11". For convenience, these signal generating means will be generally designated A and B. The means A functions to cause adjustment of the valve means 6" proportional to the departure of the condition to be maintained from the value at which it is to be maintained, that is, proportional to the main signal, and includes means for removal of the signal generated by it at some suitable rate dependent upon the characteristics of the condition being controlled and the nature of the control desired. The means B functions to render the means A temporarily or for a greater period of time either less effective or possibly even completely ineffective, with the means B even taking over by more than offsetting the signal of the means A and thus actually resulting in a call for adjustment of the valve means 6" greater than that indicated by the main signal.

The signal generating means A takes the form of a bridge network, herein generally designated 16", for convenience shown as of the same construction as the network of Fig. 1. A resistance bridge is here shown and comprises resistors 17" and 18", a source of alternating current 19", and a pair of movable contacts 20" and 21". Connected between the contacts 20" and 21" is a coil 22" forming the primary winding of a transformer 23". The movable contact 20" is adjusted in a direction and proportionally in extent to the direction and extent of adjustment of the valve means 6" and, to that end, is here diagrammatically shown as operatively associated with the linkage 8".

Forming part of the secondary winding of the transformer 23" is a coil 24" one end or terminal of which is by a lead 70 connected to the motor control circuit 15". The other end or terminal of the coil 24" is connected to the lead 14", as will presently be more fully described, thus being connected in series with the signal generating means 9" and 11". It is, moreover, so connected as to oppose the main signal generated by the combined effect of the means 9" and 11".

Means is provided for removing the signal produced by unbalancing of the bridge 16" as an incident to adjustment of the valve means 6". This is accomplished by restoring the balance of the bridge 16" and, more particularly, by adjustment of the contact 21". To that end, there is provided a reversible, variable speed, electric motor 32" which acts through a variable speed transmission 33' and suitable linkage or gearing, diagrammatically represented at 34", to move the contact 21" in opposite directions. The motor 32" is governed by the signal generated by the network 16" and, to that end, there is provided in the secondary of the transformer 23" a coil 35" for picking up that signal. Preferably a motor control circuit 36" is utilized to govern the motor 32" in accordance with the signal. This motor control circuit can be the same as control circuit 15" or it may take any other form capable of responding to the signal produced by the bridge 16" including a circuit that is adjustable so as to result in different speeds of operation of the motor 32" for any given signal. When a control circuit of the latter type is employed, it replaces and obviates the necessity of the variable transmission 33". The coil 35" and the control circuit 36" are connected by a pair of leads 37".

While the signal generating means B might take a form different from that of the means A, it is herein shown as of the same construction. Suffice it to say, therefore, that the means comprises a resistance bridge network, generally designated 71, having a pair of resistors 72 and 73, a source of alternating current potential 74, a pair of movable contacts 75 and 76, and a coil 77 connected between the contacts forming the primary winding of a transformer 78. The secondary of the transformer is a split winding composed of a coil 79 having one end or terminal connected to the lead 14" and the other end or terminal connected by a lead 80 to the terminal of the coil 24" so as to be in series with the coil 24" and the signal generating means 9" and 11". The coil 79 is so wound that for a corresponding unbalance of the networks 71 and 16" the signal in the coil 79 will be opposed to that in the coil 24" and hence in aid of or additive to the main signal generated by the means 9" and 11".

Movable contact 75 is intended to be adjusted in a direction corresponding to and in an amount proportional to the adjustment of the valve means 6". To that end, the contact 75 is connected to the valve means 6" by an extension 8a' of the mechanical connecting linkage 8". Contact 76 is adapted to be moved to remove the unbalance of the bridge caused by movement of the contact 75 through means deriving its signal from the bridge itself. This means consists of an electric, reversible and variable speed motor 81 acting to adjust the contact 76 through a variable transmission 82 and a suitable mechanical connection or linkage, very diagrammatically shown at 83. The motor 81, as stated, is governed by the signal generated by the network 71 and to that end there is a coil 84 which forms the remaining half of the split secondary of the transformer 78. The coil is by leads 85 connected to a control circuit 86 which is of a character capable of receiving the signal picked up by the coil 84 and utilizing it to govern both the direction and speed of rotation of the motor 81. As here shown, the control circuit 86 is itself adjustable to cause operation of the motor 81 at different speeds for any given signal. Thus, if desired, the transmission 82 could be eliminated.

It will be appreciated that by adjustment of the control circuits 36″ and 86, or by adjustment of the variable transmissions, or by adjustment of both, the rate at which balance is restored to the bridge networks may be varied very greatly. It will also be apparent that by change in the values of the resistors making up the networks or of the value of the potential supplied to the networks, different signal values may be obtained for like adjustment of the contacts 20″ and 75. Due to this fact, very great flexibility of control results and the system may be adjusted to function properly in the control of conditions having widely varying characteristics or to bring about control of a condition in a great variety of ways. For example, let it be assumed that the network 71 for a like movement of the contacts 75 and 20″ produces a signal of greater magnitude than that produced by the network 16″ but that the rate of restoration of balance of the network 71 is somewhat higher than the rate of restoration of the network 16″. Under those assumptions and the further assumption that there has been a departure of the condition from the value to be maintained, the following operation would result: The change in condition, herein pressure, would be reflected in the means 9″ and there would thus result an initial main signal calling for adjustment of the valve means 6″. As the valve means 6″ is adjusted in response to the main signal, the contact 20″ is, of course, moved and thus the network 16″ is generating a signal tending to offset the main signal when the valve 6″ has been adjusted an amount proportional to the extent of departure in the pressure from the desired value. Were the network 16″ alone present, the result, of course, would be an arresting of adjustment of the valve means 6″ at some point calculated to be approximately the point at which the valve will eventually stabilize but short of the point where the valve would travel were it adjusted in response to the main signal alone. However, just as the contact 20″ is moved as an incident to adjustment of the valve 6″, so also the contact 75 is moved and the network 71 also generates a signal. This signal, under the conditions assumed, will be larger than the signal generated by the network 16″ and, being opposed to the signal, will more than offset it and add to the main signal. The result is that the valve 6″ is adjusted at a more rapid rate and, depending upon the relative speed at which the networks are restored to balance, possibly for a longer period of time. The effect, of course, is an opportunity for a more rapid restoration of the condition to the desired value. This adjustment is particularly useful where the response of the condition being controlled to an adjustment of the valve is slow and sluggish.

It will be appreciated that under other conditions of adjustment the network 71, instead of more than offsetting the signal of the network 16″, might just offset the signal so as merely to render the signal of the network 16″ temporarily ineffective. The other extreme, of course, would be an adjustment wherein the signal generated by the network 71 is proportionally smaller than that generated by the network 16″ but in which the restoration of balance of the network is very slow compared to that of the network 16″. The result of such adjustment is, of course, that the signal generated by the network 16″ might quickly offset the main signal and arrest further adjustment of the valve 6″. However, the more rapid balancing of the network 16″ would result in the signal of the network 71 being larger at a later time in the operation of stabilizing the condition, thereby resulting in an additional small adjustment being given to the valve 6″.

For convenience and clarity, many of the actions which take place have been treated as occurring sequentially. Actually, of course, they tend to occur simultaneously. With any adjustment of the valve means 6″, there is, of course, an unbalance of the bridge networks and with any such unbalance the means actuating the contacts 21″ and 76 come into play to restore the balance. Also, while the various bridge networks are generating signals either tending to offset or to add to the main signal, and thus arrest or continue adjustment of the valve means 6″, the condition itself is, of course, changing and thus changing the main signal that is being generated. There are, moreover, slight readjustments of the valve means 6″ for any one change in condition because, necessarily, the valve means must initially be overadjusted somewhat in order to make up for the change in condition that has already taken place. By that is meant if, for example, the load suddenly increases very greatly so as to cause a pressure drop, the supply of fluid must first be increased not only to supply the present increased demand but it must be further increased to have a temporary excess supply so as to restore the pressure to the predetermined value to be maintained. With this system, however, the valve means 6″ is quickly adjusted to that position wherein the conditions are again stabilized.

I claim as my invention:

1. A system for controlling a condition comprising, in combination, adjustable condition influencing means, power means for adjusting said condition influencing means, a first signal generating means manually adjustable to generate a signal proportional to the value of the condition desired to be maintained, a second signal generating means responsive to the condition and operable to generate a signal proportional to the state of the condition, said signal generating means being arranged to generate opposed signals and connected to produce a main control signal which is the resultant of the signals, means responsive to the main signal controlling said power means in accordance therewith to effect adjustment of said condition influencing means in one direction or the other depending upon the direction of departure of the condition from the desired value, and means for modifying the main signal including a bridge network having a pair of movable contacts, plural means responding to a signal generated as an incident to unbalance of said network, one of said plural means being connected in circuit with said first and said second signal generating means, means for adjusting one of said movable contacts in a direction and to an extent corresponding to the adjustment of said condition influencing means, and means for adjusting the remaining one of said contacts, said last named means being under the control of the remaining one of said plural means and tending to restore said network to balance.

2. A system for controlling a condition comprising, in combination, adjustable condition influencing means, power means for adjusting said condition influencing means, a first signal generating means manually adjustable to generate a signal proportional to the value of the condition desired to be maintained, a second signal generating means responsive to the condition and operable to generate a signal proportional to the state of the condition, said signal generating means being arranged to generate opposed signals and connected to produce a main control signal which is the resultant of the signals, means responsive to the main signal controlling said power means in accordance therewith to effect adjustment of said condition influencing means in one direction or the other depending upon the direction of departure of the condition from the desired value, and means for modifying the main signal including a bridge network having a pair of movable contacts, plural means responding to a signal generated as an incident to unbalance of said network, one of said plural means being connected in circuit with said first and said second signal generating means, means for adjusting one of said movable contacts in a direction and to an extent corresponding to the adjustment of said condition influencing means, and means for adjusting the remaining one of said contacts, said last named means being under the control of the remaining one of said plural means and tending to restore said network to balance and including adjustable means for varying the rate at which said remaining contact is adjusted.

3. A system for controlling a condition comprising, in combination, adjustable condition influencing means, power means for adjusting said condition influencing means, means responsive to the condition indicating variation in the value of the condition, a manual device adjustable to predetermine the value of the condition to be maintained, means including said manually adjustable device and said means responsive to the condition operable upon departure of the condition from the predetermined value to generate a main signal calling for adjustment of said condition influencing means in one direction or the other depending upon the direction of departure of the condition from the predetermined value, a device having two adjustable elements and operable when said elements are out of proper relative position to generate an electrical signal, means coupled to said device to be energized by said signal and through an adjustable potentiometer coupled to said manual means and said condition responsive means to offset the main signal, one element being adjusted in proportion and in a direction corresponding to the adjustment of said condition influencing means and means for adjusting the other one of said elements to restore said elements to proper relative position including a motor for adjusting said element, means responsive to the signal generated by said device controlling said motor, and manually settable means for varying the effect of rotation of said motor on adjustment of said other element.

4. A system for controlling a condition comprising, in combination, adjustable condition influencing means, power means for adjusting said condition influencing means, means responsive to the condition indicating variation in the value of the condition, a manual device adjustable to predetermine the value of the condition to be maintained, means including said manually adjustable device and said means responsive to the condition operable upon departure of the condition from the predetermined value to generate a main signal calling for adjustment of said condition influencing means in one direction or the other depending upon the direction of departure of the condition from the predetermined value, means operable as an incident to adjustment of said condition influencing means to generate a signal tending to offset the signal calling for adjustment of said condition influencing means, means responsive to said offsetting signal operating to remove the same including means for adjusting the rate of removal of said offsetting signal for any given offsetting signal, and apparatus brought into operation as an incident to adjustment of said condition influencing means acting on said offsetting signal generating means to modify said offsetting signal.

5. A system for controlling a condition comprising, in combination, adjustable condition influencing means, power means for adjusting said condition influencing means, means responsive to the condition indicating variation in the value of the condition, a manual device adjustable to predetermine the value of the condition to be maintained, means including said manually adjustable device and said means responsive to the condition operable upon departure of the condition from the predetermined value to generate a main signal calling for adjustment of said condition influencing means in one direction or the other depending upon the direction of departure of the condition from the predetermined value, and means for modifying the main signal comprising a bridge network including means for unbalancing the bridge as an incident to adjustment of said condition influencing means, means operable under the control of the signal generated by the network to restore the network to balance, and voltage varying apparatus electrically connected to said network to provide a variable potential for said network and associated with said condition influencing means to be varied with adjustment thereof 6. A system for controlling a condition comprising, in combination, adjustable condition influencing means, power means for adjusting said condition influencing means, means responsive to the condition indicating variation in the value of the condition, a manual device adjustable to predetermine the value of the condition to be maintained, means including said manually adjustable device and said means responsive to the condition operable upon departure of the condition from the predetermined value to generate a main signal calling for adjustment of said condition influencing means in one direction or the other depending upon the direction of departure of the condition from the predetermined value, and means for modifying the main signal comprising a bridge network including means for unbalancing the bridge as an incident to adjustment of said condition influencing means, means operable under the control of the signal generated by the network to restore the network to balance, and means providing a variable potential for said network comprising a bridge network unbalanced as an incident to adjustment of said condition influencing means, means operable under the control of the signal generated by said last named bridge network to restore the same to balance, and a potentiometer providing the potential for said first named network coupled to said second named bridge network to provide a potential proportional to the unbalance of said second named bridge network.

7. A system for controlling a condition comprising, in combination, adjustable condition influencing means, power means for adjusting said condition influencing means, a first signal generating means manually adjustable to generate a signal proportional to the value of the condition desired to be maintained, a second signal generating means responsive to the condition and operable to generate a signal proportional to the state of the condition, said signal generating means being arranged to generate opposed signals and connected to produce a main control signal which is the resultant of the signals, means responsive to the main signal controlling said power means in accordance therewith to effect adjustment of said condition influencing means in one direction or the other depending upon the direction of departure of the condition from the desired value, and means for modifying the main signal including a bridge network having a pair of movable contacts and operable upon unbalance of said network to generate a signal opposite to the main signal, means associated with said condition influencing means operable upon adjustment thereof to move one of said pair of contacts in a direction and to an extent corresponding to the movement of said condition influencing means, means controlled by the signal generated by said bridge network to operate to move the other of said contacts to restore said bridge network to balance, and means providing the potential for said bridge network comprising a potentiometer and a second bridge network, each said potentiometer and said second network having a movable contact actuated as an incident to and proportional to adjustment of said condition influencing means, and means controlled by the signal generated by said last mentioned network tending to restore said last named network and said potentiometer to normal balanced condition.

8. A system for controlling a condition comprising, in combination, adjustable condition influencing means, power means for adjusting said condition influencing means, a first signal generating means manually adjustable to generate a signal proportional to the value of the condition desired to be maintained, a second signal generating means responsive to the condition and operable to generate a signal proportional to the state of the condition, said signal generating means being arranged to generate opposed signals and connected to produce a main control signal which is the resultant of the signals, means responsive to the main signal controlling said power means in accordance therewith to effect adjustment of said condition influencing means in one direction or the other depending upon the direction of departure of the condition from the desired value, and means for modifying the main signal including a first and a second bridge network and a potentiometer associated with said first bridge network to provide the potential therefor and physically associated with said second bridge network to move with an element of said second network, each of said networks being operatively associated with said condition influencing means to be unbalanced as an incident to adjustment of said condition influencing means, and means for each of said networks and controlled by the signal generated thereby operating to restore said networks to balance, said last named means being adjustable to vary the rate at which balance is restored.

9. A system for controlling a condition comprising, in combination, adjustable condition influencing means, power means for adjusting said condition influencing means, means responsive to the condition indicating variation in the value of the condition, a manual device adjustable to predetermine the value of the condition to be maintained, means including said manually adjustable device and said means responsive to the condition operable upon departure of the condition from the predetermined value to generate a main signal calling for adjustment of said condition influencing means in one direction or the other depending upon the direction of departure of the condition from the predetermined value, a first means operable as an incident to adjustment of said condition influencing means to generate a signal opposed to the main signal, a second means operable as an incident to adjustment of said condition influencing means to generate a signal additive to said main signal, and apparatus for each said first and said second means operable under the control of the respective means for eliminating the signal being generated by the means.

10. A system for controlling a condition comprising, in combination, adjustable condition influencing means, power means for adjusting said condition influencing means, a first signal generating means manually adjustable to generate a signal proportional to the value of the condition desired to be maintained, a second signal generating means responsive to the condition and operable to generate a signal proportional to the state of the condition, said signal generating means being arranged to generate opposed signals and connected to produce a main control signal which is the resultant of the signals, means responsive to the main signal controlling said power means in accordance therewith to effect adjustment of said condition influencing means in one direction or the other depending upon the direction of departure of the condition from the desired value, a third and fourth signal generating means connected in series with said first and said second signal generating means and in opposition to one another, each said third and said fourth signal generating means being operable as an incident to adjustment of said condition influencing means to generate a signal, each said third and said fourth signal generating means having apparatus operable under the control of the signal generated by the one of said third or fourth means with which the apparatus is associated to function to eliminate the signal generated thereby.

PAUL GLASS.

REFERENCES CITED

The following references are of record in the file of this patent:

UNITED STATES PATENTS

| Number | Name | Date |
| --- | --- | --- |
| 2,300,537 | Davis | Nov. 3, 1942 |
| 2,313,079 | Lilja | Mar. 9, 1943 |
| 2,336,994 | MacKay | Dec. 14, 1943 |
| 2,390,793 | Jones | Dec. 11, 1945 |